United States Patent
Giuliano et al.

(10) Patent No.: US 9,650,151 B2
(45) Date of Patent: May 16, 2017

(54) METHOD AND DEVICE FOR ASSISTING THE MANAGEMENT OF PROCEDURES, NOTABLY OF FAILURES OF SYSTEMS OF AN AIRCRAFT

(71) Applicant: Airbus Operations S.A.S., Toulouse (FR)

(72) Inventors: Sébastien Giuliano, Leguevin (FR); Quentin Chenevier, Toulouse (FR)

(73) Assignee: Airbus Operations S.A.S. (FR)

( * ) Notice: Subject to any disclaimer, the term of this patent is extended or adjusted under 35 U.S.C. 154(b) by 37 days.

(21) Appl. No.: 14/881,646

(22) Filed: Oct. 13, 2015

(65) Prior Publication Data

US 2016/0107763 A1 Apr. 21, 2016

(30) Foreign Application Priority Data

Oct. 21, 2014 (FR) ..................... 14 60134

(51) Int. Cl.
*B64D 45/00* (2006.01)
*B64D 43/00* (2006.01)
(Continued)

(52) U.S. Cl.
CPC .............. *B64D 45/00* (2013.01); *B64D 43/00* (2013.01); *G05B 23/02* (2013.01); *G05B 23/0216* (2013.01); *G05B 23/0243* (2013.01); *G05B 23/0272* (2013.01); *G05B 23/0281* (2013.01); *G06F 3/01* (2013.01); *G06F 11/32* (2013.01); *G06F 11/327* (2013.01); *G08G 5/0021* (2013.01); *G08G 5/0052* (2013.01); *G08G 5/0056* (2013.01); *G10L 15/183* (2013.01);
(Continued)

(58) Field of Classification Search
None
See application file for complete search history.

(56) References Cited

U.S. PATENT DOCUMENTS 5,652,897 A * 7/1997 Linebarger .......... G10L 15/1822
704/1
9,019,127 B2 4/2015 Gautheron et al.
(Continued)

FOREIGN PATENT DOCUMENTS

FR 2 989 806 A1 10/2013
WO 95/26012 A1 9/1995

OTHER PUBLICATIONS

French Search Report dated Jun. 19, 2015 (FR 14 60134).

*Primary Examiner* — Russell Frejd
(74) *Attorney, Agent, or Firm* — Lerner, David, Littenberg, Krumholz & Mentlik, LLP

(57) ABSTRACT

The device includes a centralized warning system able to detect failures of systems of the aircraft and to display procedure lines on a screen, a procedure line including a text giving an indication of an action to be executed at least in the case of a failure, a semantic analysis module for determining from a current procedure line if the action to be executed is associated with a controllable control button and for implementing a semantic analysis of the text of the procedure line using word recognition and in order to derive therefrom indications relative to the controllable control button, these indications including at least an identification of the control button, and a warning unit receiving these indications and being able to warn a member of the crew.

15 Claims, 5 Drawing Sheets

(51) Int. Cl.
*G08G 5/00* (2006.01)
*G06F 3/01* (2006.01)
*G06F 11/32* (2006.01)
*G05B 23/02* (2006.01)
*G10L 15/18* (2013.01)
*G10L 15/183* (2013.01)
*G10L 15/08* (2006.01)

(52) U.S. Cl.
CPC .... *G10L 15/1815* (2013.01); *G10L 2015/086* (2013.01); *G10L 2015/088* (2013.01)

(56) References Cited

U.S. PATENT DOCUMENTS

2010/0066565 A1\* 3/2010 Francois ................. G06F 8/30
340/963
2011/0246002 A1\* 10/2011 Shavit ................. G08G 5/0026
701/14
2013/0179011 A1 7/2013 Colby et al.

\* cited by examiner

METHOD AND DEVICE FOR ASSISTING THE MANAGEMENT OF PROCEDURES, NOTABLY OF FAILURES OF SYSTEMS OF AN AIRCRAFT

TECHNICAL FIELD

The present invention relates to a method and a device for assisting the management of procedures, notably of failures of systems of an aircraft, in particular of a transport airplane.

BACKGROUND OF THE INVENTION

It is known that an aircraft such as a transport airplane is generally provided with a central onboard warning system or computer, of the FWS (Flight Warning System) type, for example named ECAM (for "Electronic Centralized Aircraft Monitor", the French translation of which is "surveillance électronique centralisée de l'aéronef"). This FWS system monitors functions of the aircraft and transmits corresponding items of information to the pilot or pilots of the aircraft. The FWS system also generates, if necessary, messages giving details of failures and, in certain cases, lists of procedures to implement in order to overcome a particular problem (or failure).

In order to do this, the FWS system receives data from:
- systems of the aircraft, in order to command the triggering of audio and/or visual warning signals, and in order to display warning procedures when a failure is detected; and
- control buttons, for verifying that a particular action has been executed during the implementation of a procedure.

The FWS system generally comprises one or more computers and a display unit, and its function is:
- to display checklists or lists of actions to be executed (or carried out) in order to configure or reconfigure systems of the aircraft when a new situation or new flight phases are entered (for example when changing from cruise flight to a descent); and
- to display procedures to be carried out in order to reconfigure systems of the aircraft, when a failure is detected in one of the systems of the aircraft.

All of the actions (to be executed) in order to reconfigure the systems are displayed and the crew must carry out each action, one after the other.

Certain procedures require a large number of actions to be executed, which increases the workload of the crew.

BRIEF SUMMARY OF THE INVENTION

An aspect of the present invention may overcome this disadvantage by making it possible to reduce the workload of the crew. It relates to a method for assisting the management of procedures, notably of failures of systems of an aircraft, said aircraft being provided with a centralized warning system comprising at least one screen, the centralized warning system being configured to be able to detect failures of systems of the aircraft and to display procedure lines on the screen, a procedure line comprising a text giving an indication of an action to be executed.

According to an aspect of the invention, said method includes:

E1/ receiving the content of a procedure line comprising an indication of an action to be executed, as displayed on the screen;

E2/ determining if the action of this procedure line to be executed is associated with a controllable control button that can be actuated in order to initiate the execution of the action and, in the affirmative, implementing a semantic analysis of the text of the procedure line by means of word recognition, in order to derive therefrom indications relating to the controllable control button, these indications comprising at least an identification of the control button;

E3/ transmitting these indications to at least one warning unit in order to warn a member of the crew of the aircraft.

Thus, thanks to the invention, by determining and providing indications to the crew, as described above, the execution of a procedure for managing procedures, notably (but not exclusively) during a failure, is assisted, which makes it possible to reduce the workload of the crew and to overcome the abovementioned disadvantage.

Advantageously, step E3/ is configured to transmit the indications to at least one warning element informing of the possibility of an automatic execution of the action to be executed, and step E3/ comprises a monitoring sub-step, consisting of monitoring the actuation of an automatic execution button, and a command sub-step consisting, in the case of actuation of the automatic execution button by a member of the crew of the aircraft, of automatically commanding the execution of the action.

Moreover, advantageously, step E3/ is configured to transmit the indications to at least one touch-sensitive screen displaying and highlighting at least one control button corresponding to said identification, the highlighted control button being configured to be able to be actuated by a member of the crew of the aircraft in order to trigger the execution of the action. Moreover, in this case, advantageously, the control buttons displayed on the touch-sensitive display screen, other than said highlighted control button, are locked with respect to actuation. Preferably, the method also comprises an unlocking step consisting of allowing an operator to unlock the locked control buttons.

Moreover, advantageously, step E3/ includes transmitting the indications to a display unit, the display unit displaying a synoptic page of at least one system of the aircraft, related to the action to be executed.

Moreover, in a preferred embodiment, the semantic analysis used in step E2/includes, starting from the received procedure line comprising a text giving an indication of an action to be executed, of carrying out the following successive operations:

A/ checking if the action has been executed or not, and:

A1/ if the action has not been executed, splitting the text of the procedure line into two parts, namely a first part comprising an identification of a control button and a second part indicating a position of the control button, extracting the identification and the position from them, and moving on to a step B/;

A2/ otherwise, issuing an error message;

B/ checking if the extracted identification is part of a predetermined first set of identifications of control buttons, and:

B1/ if the identification is part of this first set, moving on to a step C/;

B2/ otherwise, issuing an error message;

C/ checking if the extracted position is part of a predetermined second set of controllable positions, and:

C1/ if the position is part of this second set, transmission of the identification and the position of the control button;

C2/ otherwise, transmitting only the identification of the control button.

The present invention also relates to a device for assisting the management of procedures, notably of failures of systems, of an aircraft, said device comprising a centralized warning system comprising at least one screen, the centralized warning system being configured to be able to detect failures and to display procedure lines on the screen, a procedure line comprising a text giving an indication of an action to be executed.

According to an embodiment of the invention, said device comprises moreover:

- a control module comprising a semantic analysis module, the semantic analysis module being configured to receive a current procedure line, the semantic analysis module also being configured to determine from the current procedure line if the action to be executed is associated with a controllable control button able to be actuated in order to trigger the execution of the action and in order to implement a semantic analysis of the text of the procedure line using word recognition and in order to derive therefrom indications relative to the controllable control button, these indications comprising at least an identification of the control button; and
- at least one warning unit associated with said semantic analysis module, said warning unit receiving these indications and being able to warn a member of the crew.

In a first embodiment, the warning unit comprises at least one alarm element informing of the possibility of an automatic execution of the action to be executed. Preferably, the alarm element corresponds to one of the following elements:
- at least one symbol displayed on a display unit;
- at least one luminous element configured to emit a light signal.

Moreover, advantageously, the warning unit comprises at least one automatic execution button, and the control module is configured, in the case of actuation of the automatic execution button by an operator, to automatically command the execution of the corresponding action.

Moreover, in a second particular embodiment, the warning unit comprises a touch-sensitive display screen configured to highlight a control button corresponding to said identification, the control button highlighted on the touch-sensitive display screen being configured so that an actuation of this control button commands execution of the action. Preferably, the touch-sensitive display screen is configured to display a plurality of control buttons and to lock, with respect to actuation, the control buttons other than said highlighted control button, and the warning unit comprises an unlocking unit configured to allow an operator to unlock the locked control buttons.

Moreover, advantageously, the warning unit comprises a display screen configured to display a synoptic page of at least one system related to the action to be executed.

Moreover, advantageously, the control module comprises a database comprising at least some of the following items of information:
- names and abbreviations of terms used at least in procedure lines;
- identifications of control buttons;
- positions of controllable control buttons.

BRIEF DESCRIPTION OF THE DRAWINGS

The appended figures will give a good understanding of how the invention can be embodied. In these figures, identical references denote similar elements.

DETAILED DESCRIPTION

Figure 1:
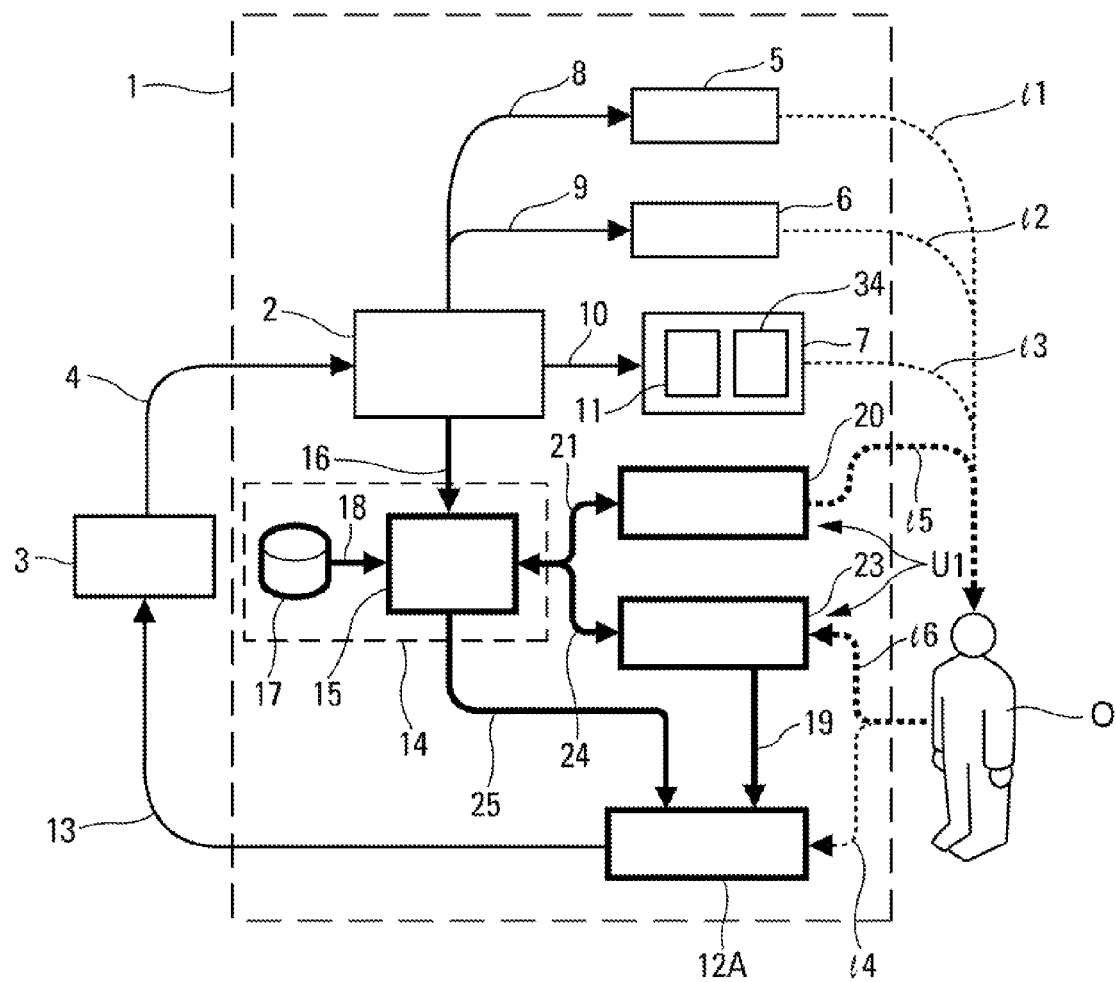
FIG. 1 is the block diagram of a first embodiment of a failure management system.
Figure 2:
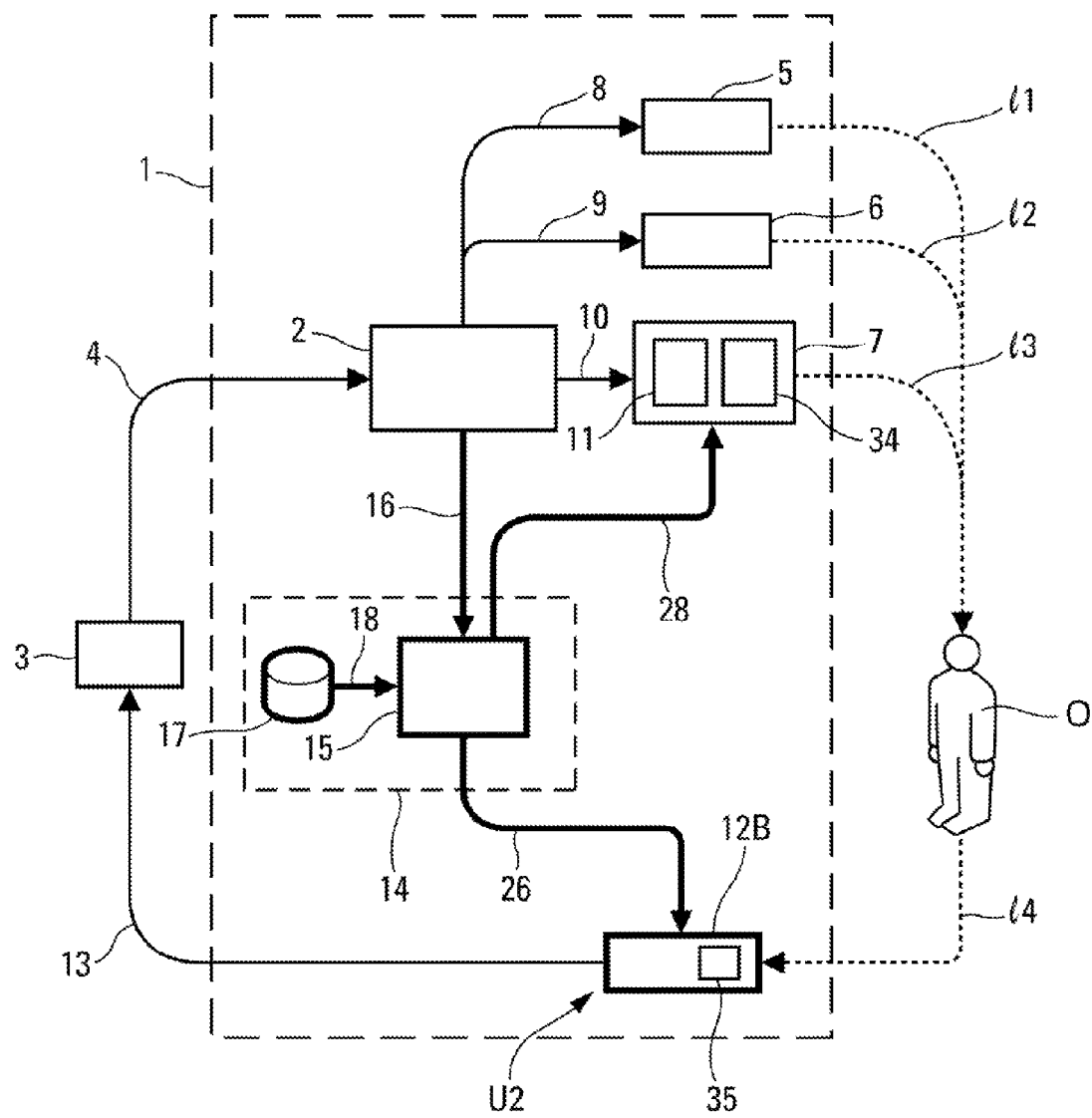
FIG. 2 is the block diagram of a second embodiment of a failure management system.

The device 1 shown diagrammatically in FIGS. 1 and 2 according to two different embodiments making it possible to illustrate aspects of the invention, is notably designed to assist the processing and management of procedures, notably of failures, relating to systems (flight control, fuel supply, deicing, etc.) of an aircraft (not shown), in particular of a transport airplane.

This device 1 comprises an onboard centralized warning system (or computer) 2, of the FWS (Flight Warning System) type, for example called ECAM (standing for "Electronic Centralized Aircraft Monitor").

The centralized (or central) warning system 2 monitors functions of a set 3 of systems of the aircraft, to which it is connected (directly or indirectly) as illustrated by an arrow 4, and it transmits corresponding items of information to the pilot or pilots of the aircraft. The centralized warning system 2 also generates, if necessary, messages giving details of the failures and, in certain cases, lists of procedures to implement in order to overcome a failure or a particular problem.

The centralized warning system 2 is a central processing system, which detects failures and/or flight phases, and sends appropriate data to a control unit 5, to an audio unit 6 and to a display unit 7, via links 8 to 10 respectively. More precisely:
- the control unit 5 comprises a set of buttons which are highlighted in the case of a warning (notably following a failure) and which must be pressed by an operator in order to stop a warning;
- the audio unit 6 groups devices (loud speakers or headphones) in order to emit audible warning signals; and
- the display unit 7 comprises at least one warning display screen 11 of the WD (Warning Display) type.

Moreover, the device 1 comprises a control interface (or panel) 12A, 12B, of the ICP (Integrated Control Panel) type, which comprises buttons or even one or more touch pads, as described below.

The centralized warning system 2 receives data from systems of the aircraft (as illustrated by the link 4) and, when a failure is detected, it commands, via the links 8 to 10, the triggering of audio and/or visual warning signals by the units 5 and 6 and the display of warning procedures by the display unit 7.

Moreover, the centralized warning system 2 receives data from control buttons (for example from the control interface 12A, 12B), to check that an action has been executed during the implementation of a procedure.

The function of the centralized warning system 2 is:
- to display (for example on the warning display screen 11) checklists or lists of actions to be executed (or carried out) in order to configure or reconfigure systems of the aircraft when a new situation or a new flight phase occurs (for example when changing from cruise flight to descent); and to display (notably on the warning display screen 11) procedures to be carried out in order to reconfigure systems de the aircraft when a failure is detected in one of the systems of the aircraft. For example, when a fuel pump is detected to have failed, a procedure requesting the crew to switch it off is displayed.

The centralized warning system 2 is configured to display procedure lines on the warning display screen 11 at least in the case of failure, a procedure line comprising for example an indication of an action to be executed.

In FIGS. 1 and 2, there is also a representation of an operator O, notably a pilot of the aircraft, who can become aware of information generated by the units 5, 6 and 7, as illustrated by arrows 11, 12 and 13 shown in dashed line. The operator O can also act on the control interface 12A, 12B, as illustrated by an arrow 14 shown in dashed line.

The device 1 comprises moreover:

a control module 14 comprising a semantic analysis module 15. The semantic analysis module 15 is configured to receive a current procedure line, a procedure line comprising for example an indication of an action to be executed. The semantic analysis module 15 is also configured to determine from the current procedure line if the action to be executed is associated with a controllable control button to be actuated in order to execute this action and, in the affirmative, in order to implement a semantic analysis of the text of the procedure line using word recognition, in order to derive therefrom indications relative to the controllable control button, as described below, these indications comprising at least the identification of the control button; and at least one warning unit U1, U2 linked to said semantic analysis module 15 and described below, the warning unit U1, U2 receiving these indications and being capable of warning a member of the crew.

It is considered that a control button is controllable if its state can be modified, particularly for the purpose of commanding the execution of an action. The state can have different controllable positions ("ON" ("allumé" in French), "OFF" ("éteint" in French), . . . ).

Thus, by determining and providing indications to the crew via the warning unit U1, U2, in particular in the event of a failure, as described below, the device 1 assists the crew in executing a failure management procedure.

In the context of the present invention, two main embodiments are foreseen, for using the indications supplied by the control module 14, which are shown in FIGS. 1 and 2 respectively.

These embodiments each show the elements described above and notably the semantic analysis module 15 which is connected to the centralized warning system 2 via a link 16.

This semantic analysis module 15 comprises a central processing unit of the CPU (Central Processing Unit) type and is associated with a database 17 forming part of the control module 14. The central processing unit receives the same data as the centralized warning system 2, namely text data, for example via the link 16.

Moreover, the database 17, which is connected to the semantic analysis module 15 via a link 18 as shown in FIGS. 1 and 2 or which is integrated in the latter, comprises the following information:

names and abbreviations of terms used at least in procedure lines;

identifications of control buttons;

positions of controllable control buttons.

In the first embodiment shown in FIG. 1, the warning unit U1 comprises at least one warning element 20. This warning element 20 is activated by the control module 14 via a link 21 in order to inform the crew of the possibility of an automatic execution of an action to be executed, as illustrated by a link 15. The warning element 20 is activated until a crew member executes the required action.

Figure 4:
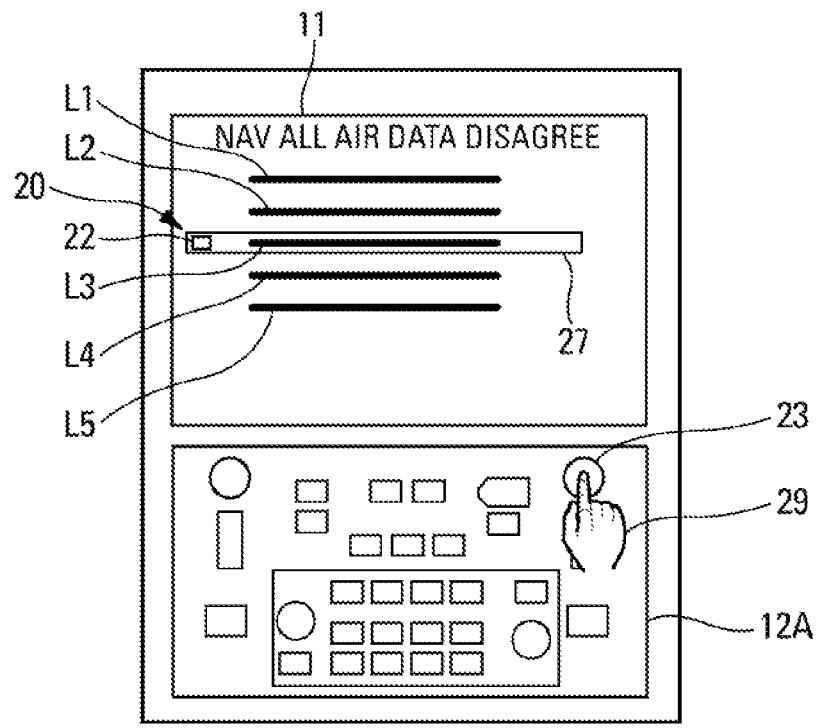
FIGS. 4 and 5 diagrammatically show means of the first embodiment of the failure management system, used for the implementation of particular situations.
Figure 5:
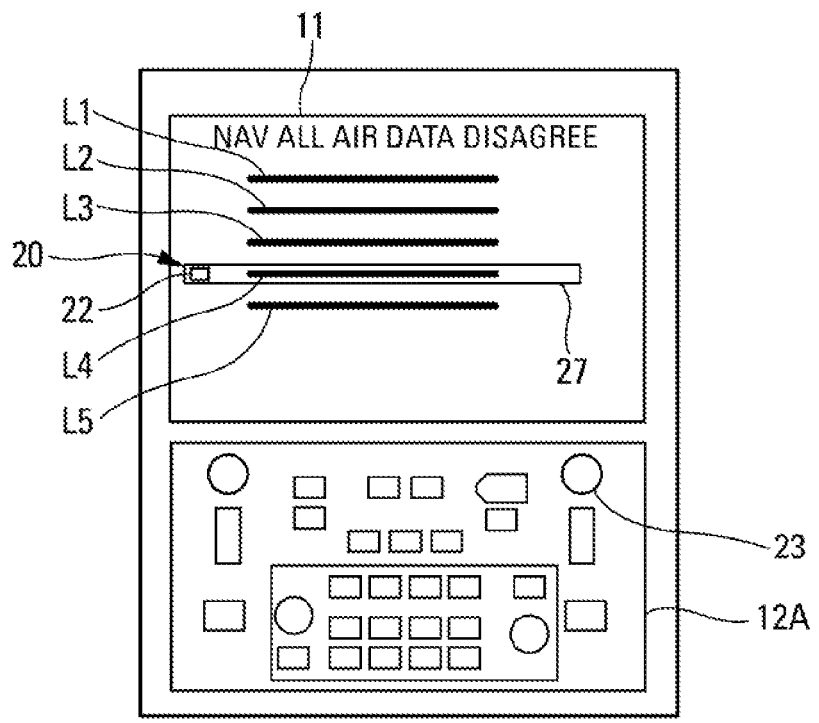

The warning element 20 can be embodied in different forms. In particular, it can be embodied in the form:

of a visual symbol displayed on a display screen, and notably on the warning display screen 11, and this occurring:

either at the start of the procedure line to be automated, as represented by a symbol 22 in FIGS. 4 and 5;

or at a fixed location on the display screen; or, of a luminous element configured to emit a light signal. This luminous element may or may not be incorporated in a control button, and it can be located at different places. In particular it can be placed:

near a display screen;

near the control interface 12A;

near buttons on the tower;

near or within an automatic execution button (wherever it may be located).

Moreover, in this first embodiment, the warning unit U1 comprises at least one automatic execution button 23. Moreover, the control module 14 is configured to automatically command the execution of the corresponding action in the case of actuation of the automatic execution button 23 by a crew member. This actuation is detected by the control module 14 for example via a link 24.

Consequently, the actuation of the automatic execution button 23 puts the controllable control button into the requested position (via the control module 14 and the links 24 and 25 or directly via a link 19) and generates an automatic execution of the corresponding action to be executed.

The controllable control button is thus automatically controllable with a change of state. The state of the controllable control button can also be changed by the crew simply by pressing the corresponding control button.

In the first embodiment shown in FIG. 1, the device 1 therefore comprises a warning element 20 and an automatic execution button 23, in addition to the semantic analysis module 15, as shown in thick line.

The warning element 20 and the automatic execution button 23 can be either different buttons or the same button (of the push-button type or a touch-sensitive screen button). "Touch-sensitive screen button" is understood to mean a touch-sensitive area located on the touch-sensitive screen which is sensitive to a contact, notably by a finger, and whose contact generates the same command as a push-button.

In a particular embodiment, the automatic execution button can correspond to a push-button of a man/machine interface of the ECAM (the man/machine interface is called "ECP", standing for "ECAM Control Panel").

Thus, in the context of the present invention, the automatic execution button 23 can be notably:

a dedicated push-button, that can be located at different places in the cockpit;

the same button as the one used for checking the procedure lines on a display of the ECAM.

The functioning of this first embodiment will be described in greater detail below, with reference to FIGS. 4 and 5.

Moreover, in a second particular embodiment shown in FIG. 2, the warning unit U2 comprises, as a control interface, a touch-sensitive display screen 12B. This touch-sensitive display screen 12B is configured to highlight the control button corresponding to the identification received from the control module 14 via a link 26. The corresponding control button 30 (FIGS. 6 and 7) is configured so that an actuation of this control button 30 triggers the execution of the action (which is carried out in the usual manner). The control module 14 is also connected to the display unit 7 by a link 28.

In this second embodiment, the control panels of the ICP type are replaced by the touch-sensitive display screen 12B, which can be placed anywhere in the cockpit (in the centre, on the ceiling).

Figure 6:
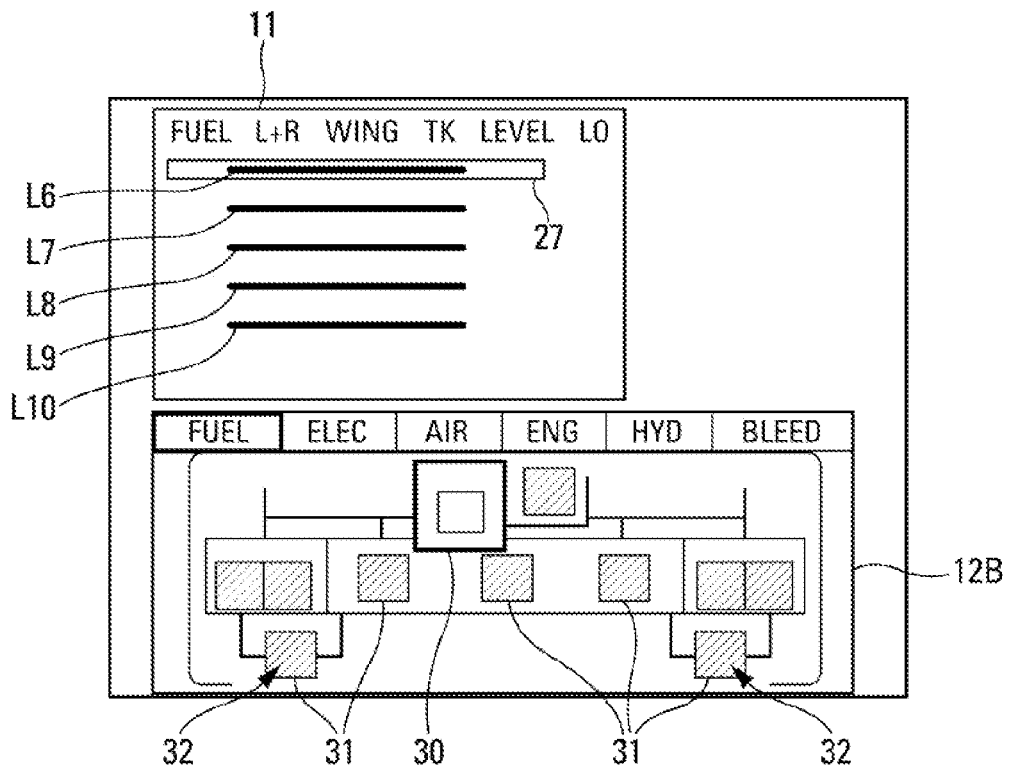
FIGS. 6 and 7 diagrammatically show means of the second embodiment of the failure management system, used of the implementation of particular situations.
Figure 7:
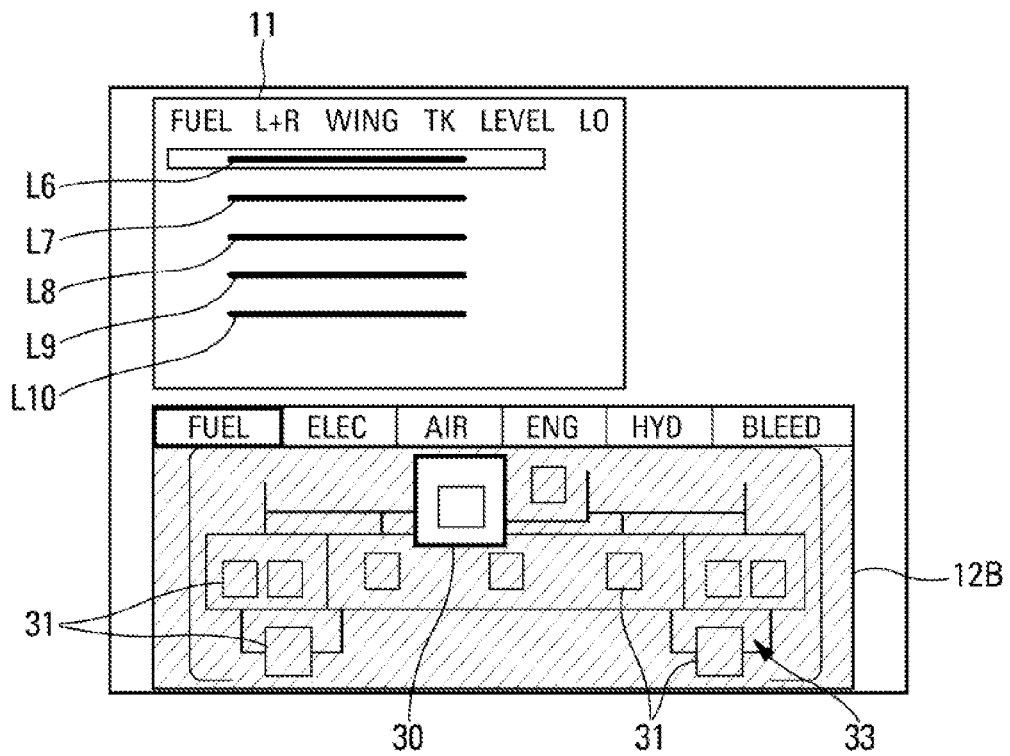

Moreover, in a preferred realization of this second embodiment, the touch-sensitive display screen 12B is configured to lock, with respect to actuation, the control buttons 31 other than the highlighted control button 30, as shown in FIGS. 6 and 7, which prevents an unwanted actuation of these other control buttons. Moreover, the warning unit U2 comprises an unlocking unit 35 (for example integrated in the touch-sensitive display screen 12B) which is configured to allow an operator to unlock the locked control buttons.

The control buttons, other than said highlighted control button, can be locked with respect to actuation, either individually or by a locking screen covering the entire displayed page apart from the appropriate control button, as described below with reference to FIGS. 6 and 7 respectively.

The functioning of this second embodiment is described in more detail hereafter, with reference to these FIGS. 6 and 7.

The device 1, such as realized according to one or other of the aforesaid first and second embodiments, uses information of an action to be executed in order to reduce the workload of the crew and to increase the safety margins. It thus assists the crew in executing the procedures in a more efficient manner.

Figure 3:
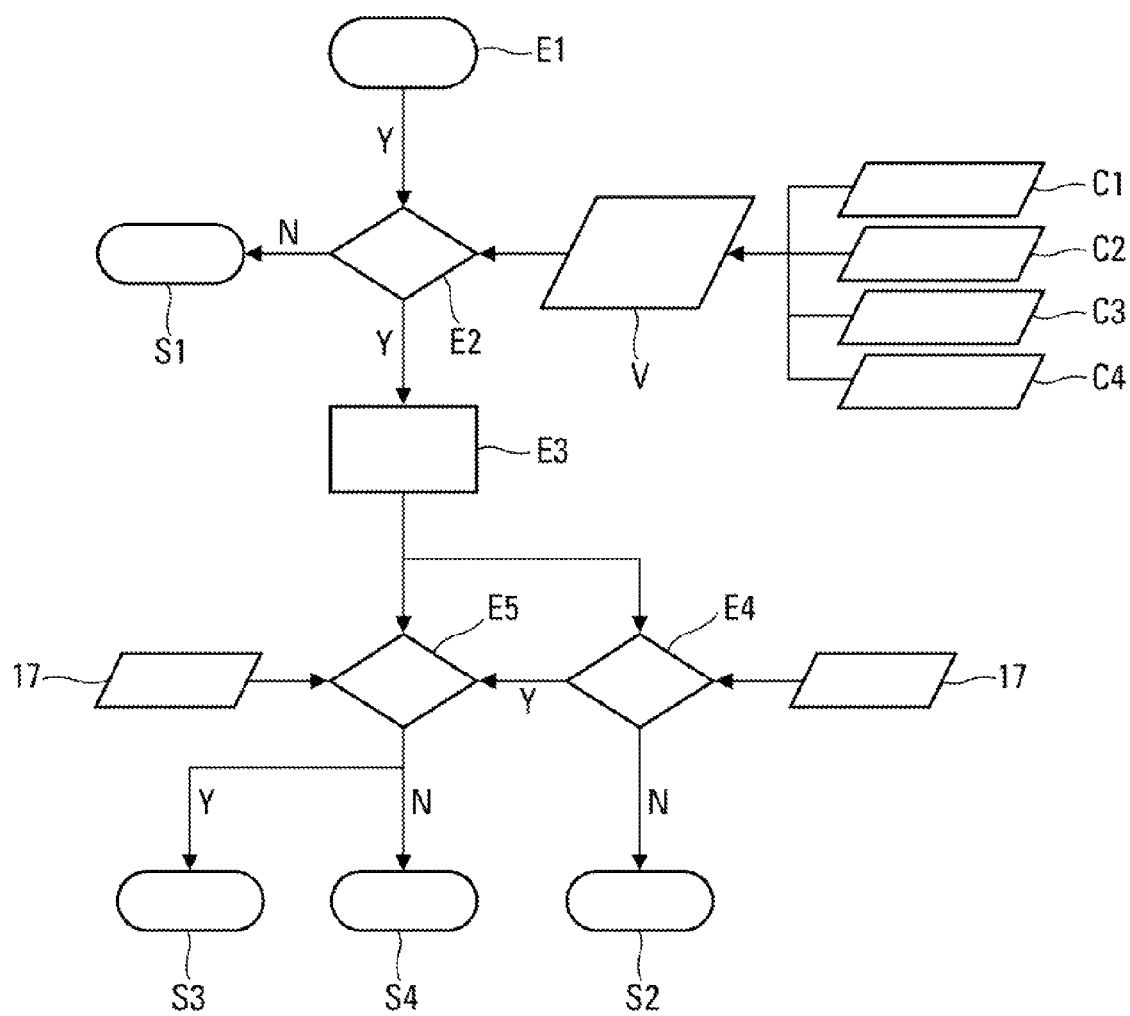
FIG. 3 is the block diagram of a method for the semantic analysis of the text of a procedure line.

The semantic analysis method (or algorithm) used by the semantic analysis module 15 (FIGS. 1 and 2) is shown in FIG. 3. It consists of carrying out processings, on the basis of an input (procedure) line, received in a step E1. In the example of FIG. 3:
  Y (for "Yes", or "oui" in French) signifies that a verified condition is obtained; and
  N (for "No", or "non" in French) signifies that a verified condition has not been obtained.

An input line for the semantic analysis algorithm is a data structure, containing the following elements:
  a text TEXT representing the content of the procedure line;
  a Boolean ACTION which defines if the procedure line is an action or not. A Boolean is a two-state variable. A variable of this type is thus either in the "True" state (which is the English term), or in the "False" state (which is the English term);
  a Boolean SENSED (detected) which defines if, for the procedure line, an action is detected or not. If the Boolean SENSED is in the "False" state (non-detectable) and indicates that, for the procedure line, it is not possible to detect, which signifies that the systems cannot detect if the action has been carried out (executed) or not. Conversely, if the SENSED Boolean is in the "True" (detectable) state and indicates that, for the procedure line, it is possible to detect, this signifies that the systems can detect if the action has been carried out or not;
  a Boolean STATE (state) which defines if the action of the procedure line is actually carried out or not.

The following three conditions C1 to C3 must be met in order that the semantic analysis method may be used:
  C1: action line: ACTION has the appropriate value (True);
  C2: detectable action: SENSED has the appropriate value (True);
  C3: action not carried out: STATE has the appropriate value (False).

Moreover, a fourth condition C4 must also be met. It must be a single action.

If the text TEXT does not contain any line of characters relative to a multiple action line, it refers to a single action. On the other hand, if the text TEXT contains signs or symbols such as "ALL" (all), "&", "or" (or), "+" or a lower case letter "s", it refers to a multiple action line.

These checks V are carried out in step E2.

If the three conditions C1 to C3 are met for the data inside the centralized warning system 2, it is not necessary to provide (in the control module 15 or in the semantic analysis module 14) additional software for checking them. They are sent by the centralized warning system 2 with the text of the procedure line.

In order to continue to the next step E3 of the algorithm, the procedure line must therefore exhibit the following characteristics:
  relate to an action;
  detectable;
  not carried out; and
  single.

All detectable single-action procedure lines have the same determined semantic structure with characteristic terms or predetermined abbreviations, used in aeronautics. For an action not yet carried out, the structure is "Designation of the control button . . . Position to obtain", for example "WING A-ICE . . . ON", where the control button is "WING A-ICE" (control button for deicing the wing) which must be set in the "ON" position (in order to activate the deicing).

The algorithm uses the semantic structure in order to extract and retrieve information, by implementing the following steps E3 to E5:
  E3/ split the procedure line into two parts, removing the dots " . . . ", namely into:
    a left hand part: containing the designation of the control button, for example "WING A-ICE" for the example mentioned above; and
    a right hand part: containing the position of the control button, for example "ON";
  E4/ recognize the designation of the control button by verification in the database 17:
    if the verification is positive, the identification which identifies the control button without ambiguity is available;
    if the verification is not successful, the control button is not recognized and the algorithm sends an error code (control button not recognized) at the output S2;
  E5/ only if E4 succeeds ("Y"), recognize if the position of the control button is controllable, by verifying a correspondence in the database 17 containing the controllable control buttons positions, using the identification of the control button (from the preceding step E4). For example, for the identified control button associated with "WING A-ICE", the controllable positions are "ON", "OFF", "AUTO":

if the position of the control button is in the database 17, the position of the control button is identified without ambiguity. The (Identification/Position) pair is sent to the control interface (output S3). This indication (or information) can be used in the aforesaid two embodiments (FIGS. 1 and 2), for example if the position of the control button is "ON";

if the position of the control button is not in the database 17, only the identification of the control button is sent to the control interface (output S4). This indication is only used in the aforesaid second embodiment. For example, if the position of the control button is "as required" ("as required") or "consider" ("consider"), this position is not a controllable position.

An output of the algorithm is obtained (such as shown in FIG. 3) for each input procedure line.

There are four possible outputs S1 to S4 of the algorithm, namely:

output S1: the input procedure line is not a detectable single action line and is not taken into account. The algorithm sends an error code (or message);

output S2: the control button is not recognized without ambiguity, and it is not therefore taken into account. The algorithm sends an error code;

output S3: the position and the identification are defined without ambiguity and they are sent to the control interface, in order to be used in one or other of the aforesaid two embodiments;

output S4: only the identification is identified without ambiguity and it is sent to the control interface, in order to be used in the second embodiment only.

The functioning of the first embodiment of the invention is described below with reference to FIGS. 4 and 5, on the basis of particular examples. In these FIGS. 4 and 5, there has been shown diagrammatically:

at the top, the warning display screen 11 forming part of the display unit 7; et at the bottom, the control interface 12A.

In the example shown in these FIGS. 4 and 5, the warning indicates a disagreement of air data instruments of the aircraft with a displayed text, for example of the type "NAV ALL AIR DATA DISAGREE" (that is to say "NAV all of the air data disagree"), on the warning display screen 11.

In this situation, the pilot is asked to compare data between the principal and backup air data systems, and to deactivate other systems of the aircraft which could disturb these air data systems (for example the deicing system).

A plurality of procedure lines L1 to L5 is also shown. These procedure lines L1 to L5, which are such as described above, are shown in FIGS. 4 and 5 simply by a thick line representing a text.

The pilot knows the action (or procedure) to use, by the highlighting of the first procedure line L1. In order to do this, this first procedure line L1 is for example surrounded by a frame (such as the frame 27), preferably a rectangle, notably shown in a particular color, for example blue.

The text of the procedure line L1 which is the current procedure line is, for example, "AIR DATA . . . CHECK", that is to say "Air Data . . . Check".

This first procedure line L1 thus highlighted is a non-detectable line. This signifies that the systems cannot detect if the action has been carried out or not. The pilot must check in the usual manner with the appropriate button. The pilot normally interacts with the centralized warning system 2 by using the control interface 12A in the usual manner.

The semantic analysis module therefore ignores this non-detectable procedure line L1 (output S1 in FIG. 3).

Moreover, if the next highlighted procedure line L2 is, for example, "AT LEAST ONE AIR DATA . . . RELIABLE ?" (that is to say "At least one air data . . . Reliable?"), it is also ignored because it is a question line and not an action line.

On the other hand, in the example shown in FIG. 4, a procedure line L3 (highlighted by the frame 27), for example "A-ICE AUTO MODE . . . OFF", is detected by the semantic analysis module 15 as being a detectable single action line. The identification of the control button and its position are recognized by the semantic analysis module 15.

The semantic analysis module 15 sends a command (Boolean) to the warning element 20 in order to activate it. As indicated above, it can be a luminous element in the cockpit or a specific symbol for example on the display unit 7. This warning element 20 informs the pilot that the action associated with the procedure line L3 can be automated. In this example, the warning element 20 is a visual symbol 21 displayed at the start of the procedure line L3 on the warning display screen 11 of the display unit 7.

This warning element 20 can be positioned elsewhere in the cockpit, for example in a central warning device or a dedicated button.

The pilot, whose hand 29 has been represented in FIG. 4, actuates the automatic execution button 23 in order to command the automatic execution of the action associated with the procedure line L3. In order to do this, the pilot can press a push-button, or touch an area of a screen in the case of a touch-sensitive screen. The actuation of the automatic execution button 23 is detected, and the semantic analysis module 15 sends the identification and the position of the control button to the control interface 12A in order to automatically initiate the action. The controllable control button ("A-ICE AUTO MODE") is put into the off ("OFF") state.

In the example of FIGS. 4 and 5, the automatic execution button 23 is located on the control interface 12A.

As the control interface 12A has triggered the action on the button, in accordance with the received position and identification, the centralized warning system 2 detects it and it commands the following displays:

the procedure line L3 is marked as being carried out via a display in a corresponding color, for example white, and without dots " . . . ", between "A-ICE AUTO MODE" and "OFF", that is to say "A-ICE AUTO MODE OFF"; and the frame 27 is moved to the next procedure line L4, in order to highlight it as shown in FIG. 5, this procedure line L4 thus becomes the current procedure line.

The functioning of the second embodiment of the invention is described hereafter, with reference to FIGS. 6 and 7 on the basis of a particular example.

In FIGS. 6 and 7, there has been shown diagrammatically:

at the top, the warning display screen 11 forming part of the display unit 7; and at the bottom, the control interface corresponding to the touch-sensitive display screen 12B.

In this example, the warning considers that the two wing fuel tanks (right and left) of the aircraft are at a low level, with for example a text "FUEL L+R WING TK LEVEL LO" and procedure lines L6 to L10. The pilot must open the "crossfeed" valves A and B in order to allow a free transfer of fuel between the two sides of the aircraft.

In this example, the first procedure line L6 (current procedure line highlighted by the frame 27) is "CROSS-FEED A . . . ON", that is to say "Crossfeed fuel supply . . . On". This procedure line L6 is a detectable single action line.

The control module 14 highlights on the touch-sensitive display screen 12B the control button 30 corresponding to the identification, on the corresponding "FUEL" page. Other pages can also be displayed, as illustrated by "ELEC", "AIR", "ENG", "HYD" and "BLEED".

Moreover, the control buttons 31, other than said highlighted control button 30, are locked with respect to actuation, and this is done individually, as illustrated by the cross-hatchings 32 for each of the control buttons 31 in FIG. 6. These cross-hatchings 32 show an individual locking of each of the control buttons 31.

FIG. 7 shows a situation identical to the situation shown in FIG. 6 but with a locking screen 33 covering the entire page except for the appropriate control button 31, instead of each control button individually as in the preceding example.

In such a locking situation (FIGS. 6 and 7), an operator can use the unlocking unit 35 (FIG. 2) to unlock the locked control buttons 31.

This unlocking unit 35 corresponds to an override mechanism to allow the pilot to initiate actions on the locked control buttons 31 if necessary. An example of an override mechanism can comprise:
- a display element displaying an override confirmation request if the pilot touches a locked control button 31, by displaying for example a question such as "Unlock all of the control buttons? Yes/No"; and
- a confirmation element, the actuation of which, by selecting the appropriate response ("Yes"), unlocks all of the control buttons 31.

Moreover, in a particular variant embodiment, able to be applied to both of the embodiments described above, the semantic analysis module 15 is linked with a synoptic display screen 34, for example forming part of the display unit 7 (FIGS. 1 and 2). The semantic analysis module 15 sends instructions to this synoptic display screen 34 in order to automatically display a synoptic page related to the procedure line being processed by the semantic analysis module 15, and more precisely a synoptic page of at least one system related to the action to be executed.

This automatic display is not carried out for actions whose effect cannot be seen on a synoptic page. By way of illustration, a procedure line of the "Anti-Ice Auto Mode . . . OFF" type is such an example, for which no display of this type is produced.

On the other hand, a procedure line of the "WING A-ICE . . . ON" type (that is to say "Wing deicing . . . On"), which requests the pilot to set the "WING A-ICE" button to "ON", can be automated. In this case, the situation could be improved by deicing certain probes. The synoptic page of the BLEED type is displayed and shows if "WING A-ICE" is in the "ON" position or not. When the pilot actuates the automatic execution button, the action is automated, and the pilot can check visually that the action has been carried out by seeing the indication on the displayed synoptic page.

The device 1, such as described above, can therefore carry out the following operations:
- it extracts the content of a current procedure line to be carried out which is displayed on the warning display screen;
- it determines if the action to be carried out relates to a controllable control button and if necessary extracts indications (identification of the button to be activated, state ("ON", "OFF", . . . ) in which it must be set) from the text of the procedure line using word recognition;
- it sends these indications:
  - in the first embodiment, notably to a warning element, with an automatic change of state of the controllable control button (instead of the crew actuating this button) and an automatic command to trigger the execution of the corresponding action; or
  - in the second embodiment, to a touch-sensitive display screen upon which the control buttons are displayed:
    - in order to highlight the control button that has to be actuated by the crew; and
    - in order to lock the other control buttons, in order to prevent the crew from an erroneous actuation; and
  - in a variant embodiment, to the synoptic display unit (for showing synoptic pages of systems) in order to display, if necessary, the appropriate page which provides information on the action to be carried out.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the management of failures of systems of an aircraft, said aircraft being provided with a centralized warning system comprising at least one screen, the centralized warning system being configured to be able to detect failures of systems of the aircraft and to display procedure lines on the screen, a procedure line comprising a text giving an indication of an action to be executed, wherein said method comprises:
   E1/ receiving the content of a procedure line comprising an indication of an action to be executed, as displayed on the screen;
   E2/ determining if the action of this procedure line to be executed is associated with a controllable control button that can be actuated to initiate the execution of the action and, in the affirmative, implementing a semantic analysis of the text of the procedure line by word recognition, to derive therefrom indications relating to the controllable control button, the indications comprising at least an identification of the control button; and
   E3/ transmitting the indications to at least one warning unit to warn a member of the crew of the aircraft.

2. The method as claimed in claim 1, wherein step E3/ comprises transmitting the indications to at least one warning element informing of the possibility of an automatic execution of the action to be executed; and
   wherein step E3/ further comprises:
      a monitoring sub-step, comprising monitoring the actuation of an automatic execution button, and
      a command sub-step, including, in the case of actuation of the automatic execution button by a member of the crew of the aircraft, of automatically commanding the execution of the action.

3. The method as claimed in claim 2, wherein step E3/ comprises transmitting the indications to at least one touch-sensitive screen displaying and highlighting at least one control button corresponding to said identification, the highlighted control button being configured to be able to be actuated by a member of the crew of the aircraft to trigger the execution of the action.

4. The method as claimed in claim 3, wherein said touch-sensitive screen displays a plurality of control buttons, wherein the control buttons, other than said highlighted control button, are locked with respect to actuation.

5. The method as claimed in claim 4, further comprising an unlocking step comprising allowing a crew member to unlock the locked control buttons.

6. The method as claimed in claim 1, wherein step E3/ comprises transmitting the indications to a display unit, the display unit displaying a synoptic page of at least one system of the aircraft, related to the action to be executed.

7. The method as claimed in claim 1, wherein the semantic analysis used in step E2/comprises, starting from the received procedure line comprising a text giving an indication of an action to be executed, of carrying out the following successive operations:
A/ checking if the action has been executed or not, and
A1/ if the action has not been executed, splitting the text of the procedure line into two parts, namely a first part comprising an identification of a control button and a second part indicating a position of the control button, extracting the identification and the position from them, and moving on to a step B/;
A2/ otherwise, issuing an error message;
B/ checking if the extracted identification is part of a predetermined first set of identifications of control buttons, and
B1/ if the identification is part of the first set, moving on to a step C/;
B2/ otherwise, issuing an error message;
C/ checking if the extracted position is part of a predetermined second set of controllable positions, and
C1/ if the position is part of this second set, transmission of the identification and the position of the control button;
C2/ otherwise, transmitting only the identification of the control button.

8. A device for assisting the management of failures of systems of an aircraft, said device comprising a centralized warning system comprising at least one screen, the centralized warning system being configured to be able to detect failures of systems of the aircraft and to display procedure lines on the screen, a procedure line comprising a text giving an indication of an action to be executed, wherein the system comprises:
a control module comprising a semantic analysis module, the semantic analysis module being configured to receive a current procedure line displayed on the screen, the semantic analysis module also being configured to determine from the current procedure line if the action to be executed is associated with a controllable control button able to be actuated to trigger the execution of the action and to implement a semantic analysis of the text of the procedure line using word recognition and in order to derive therefrom indications relative to the controllable control button, the indications comprising at least an identification of the control button; and
at least one warning unit associated with said semantic analysis module, said warning unit receiving the indications and being able to warn a member of the crew.

9. The system as claimed in claim 8, wherein the warning unit comprises at least one alarm element informing of the possibility of an automatic execution of the action to be executed.

10. The system as claimed in claim 9, wherein the alarm element corresponds to one of the following elements:
at least one symbol displayed on a display unit; and
at least one luminous element configured to emit a light signal.

11. The system as claimed in claim 8, wherein the warning unit comprises at least one automatic execution button, and
wherein the control module is configured, in the case of actuation of the automatic execution button by an operator, to automatically command the execution of the corresponding action.

12. The system as claimed in claim 8, wherein the warning unit comprises a touch-sensitive display screen configured to highlight a control button corresponding to said identification, the control button highlighted on the touch-sensitive display screen being configured so that an actuation of the control button commands the execution of the action.

13. The system as claimed in claim 12, wherein the touch-sensitive display screen is configured to display a plurality of control buttons and to lock, with respect to actuation, the control buttons other than said highlighted control button, and wherein the warning unit comprises an unlocking unit configured to allow a member of the crew of the aircraft to unlock the locked control buttons.

14. The system as claimed in claim 8, wherein the warning unit comprises a display screen configured to display a synoptic page of at least one system related to the action to be executed.

15. The system as claimed in claim 8, wherein the control module comprises a database comprising at least some of the following items of information:
names and abbreviations of terms used at least in procedure lines;
identifications of control buttons; and
positions of controllable control buttons.

* * * * *